US005896450A

United States Patent [19]
Kurihara

[11] Patent Number: 5,896,450
[45] Date of Patent: Apr. 20, 1999

[54] AUTOMATICALLY VARIABLE CIRCUIT OF SOUND LEVEL OF RECEIVED VOICE SIGNAL IN TELEPHONE

[75] Inventor: Kazuhiro Kurihara, Tokyo, Japan

[73] Assignee: NEC Corporation, Tokyo, Japan

[21] Appl. No.: 08/568,231

[22] Filed: Dec. 6, 1995

[30] Foreign Application Priority Data

Dec. 12, 1994 [JP] Japan ..................... 6-332050

[51] Int. Cl.$^6$ .......................... H04M 1/00; H03G 3/20; H04B 15/00
[52] U.S. Cl. .................. 379/387; 379/387; 379/388; 379/389; 379/390; 379/391; 379/392; 381/57; 381/94
[58] Field of Search .................. 379/387, 388, 379/390, 391, 392, 389; 381/57, 94

[56] References Cited

U.S. PATENT DOCUMENTS

| 4,829,565 | 5/1989 | Goldberg | 379/390 |
| 4,847,897 | 7/1989 | Means | 379/390 |
| 4,891,837 | 1/1990 | Walker et al. | 379/390 |
| 4,908,855 | 3/1990 | Ohga et al. | 379/387 |
| 5,297,198 | 3/1994 | Butani et al. | 379/389 |
| 5,640,450 | 6/1997 | Watanabe | 379/392 |

FOREIGN PATENT DOCUMENTS

| 0 661 858 A2 | 7/1995 | European Pat. Off. |
| 61-168747 | 10/1986 | Japan . |
| 1202960 | 8/1989 | Japan . |
| 2250455 | 10/1990 | Japan . |
| 440142 | 2/1992 | Japan . |
| 482331 | 3/1992 | Japan . |
| 2 288 959 | 1/1995 | United Kingdom . |
| WO 87/01255 | 2/1987 | WIPO . |

*Primary Examiner*—Fan S. Tsang
*Assistant Examiner*—Allan Hoosain
*Attorney, Agent, or Firm*—Whitham, Curtis & Whitham

[57] ABSTRACT

In an apparatus of adjusting a sound level of a reception voice in a telephone, an audio signal including a transmission voice signal and a peripheral noise is inputted through a microphone. A gain control signal corresponding to a level of the peripheral noise is generated while the transmission voice signal is not present and the gain control signal immediately before input of the transmission voice signal is started is held and outputted while the transmission voice signal is present. A variable gain amplifier amplifies a reception voice signal in accordance with the gain control signal such that a voice corresponding to the reception voice signal is outputted from a speaker with a sound level determined in accordance with the gain control signal.

18 Claims, 3 Drawing Sheets

AUTOMATICALLY VARIABLE CIRCUIT OF SOUND LEVEL OF RECEIVED VOICE SIGNAL IN TELEPHONE

BACKGROUND OF THE INVENTION

1. Field of the Invention

The present invention relates to a telephone, and more particularly to a circuit for automatically varying the sound level of a received voice signal in a telephone.

2. Description of Related Art

Many types of automatically variable sound level circuit in a telephone are already known. In these circuits, the sound level of a received voice signal is adjusted in accordance with a noise level inputted from a voice inputting microphone in a telephone. That is, when the level of peripheral noise is so high that it is difficult to hear the transmitted voice of another person, the sound level of the received voice signal is increased in accordance with the peripheral noise level. It is specifically important when communication is performed using a portable phone.

In order to realize such a sound level automatically variable circuit of a received voice signal, there have been some conventional proposals.

FIG. 1 is a block diagram illustrating an example of a conventional sound level automatically variable circuit for the received voice signal which is disclosed in Japanese Laid Open Utility Model disclosure (Zitsukaisho 61-168747). Referring to FIG. 1, in the operation, a noise signal is detected from a voice signal inputted from a microphone 101 by a filter circuit 121. The noise signal amplified by an amplifier 122 is rectified by a rectifying circuit 123. The rectified output voltage is compared with a preset reference voltage in a voltage comparator 124. An analog switch 126 is controlled by the output of the comparator 124 so that the feed-back amount of a variable gain amplifier 110 is varied. As a result, the gain is varied and the sound level of the received voice signal from a speaker 111 is varied.

Further, there is another proposal in which a microphone for inputting noise is provided in addition to a voice inputting microphone and the audio signals from both the microphones are inputted to a comparator to remove a voice signal component of a speaking person such that a noise component can be obtained, as described in Japanese Laid Open Patent Disclosures (Tokukaihei 4-40142 and Tokukaihei 1-202960). As a result, a variable gain amplifier is controlled in accordance with the difference between the two audio signals, i.e., the noise component.

Further, in Japanese Laid Open Patent Disclosure (Tokukaihei 4-82331), a circuit is disclosed in which peripheral noise is calculated from voice signal inputted to a voice inputting microphone using a speech codec, and compared with two threshold levels preset through a button operation by a speaking person before he calls another person or is called by another person such that the sound level of the received voice signal is varied with three levels in accordance with the noise level and the threshold levels.

Furthermore, in Japanese Laid Open Patent Disclosure (Tokukaihei 2-250455), there is disclosed a circuit in which peripheral noise is detected in an off-hook state of a telephone, and the sound level of a speaker is adjusted in accordance with the detected peripheral noise level in a communication state.

In the above-mentioned conventional sound level automatically variable circuits for a received voice signal, however, there are the following problems in the detection of peripheral noise and the gain control of amplification of the received voice signal. That is, in a method according to the Zitsukaisyou 61-168747, since the noise component having the same band as that of the voice signal is removed by the filter in the detection of the peripheral noise, the sound level of the received voice signal cannot be varied even if there is a great noise component in the same band as that of the voice signal. Also, in the methods according to Tokukaihei 4-40142 or Tokukaihei 1-202960, since a microphone different from a microphone for inputting voice is required to detect the peripheral noise, it blocks the need for a small type of telephone such as a portable telephone. In the method according to Tokukaihei 4-82331, since the speech codec section is required to execute DSP processing, there is a problem in making a telephone small, manufacturing it with a low cost, and making it operable with a small current. Further, in the method according to Tokukaihei 2-250455, since the peripheral noise is detected in the on-hook state but it is not detected in the off-hook state, i.e., in the communication state, there is a problem in that the sound level cannot be appropriately adjusted in accordance with the peripheral noise in the communication state in the telephone such as a portable telephone used a place where the peripheral circumstances are varied.

SUMMARY OF THE INVENTION

The present invention is made to solve the above conventional problems and has, as an object, to provide a sound level automatically variable circuit for a received voice signal which does not require an additional microphone different from a voice inputting microphone so that it can be made small.

Another object of the present invention is to provide a method and apparatus in which the sound level of the received voice signal can be adjusted in the communication state without influence of a transmission voice signal on which a noise component is superimposed.

In order to achieve an aspect of the present invention, an apparatus for adjusting a sound level of a reception voice in a telephone, a first embodiment includes a speaker for outputting a reception voice, a microphone for inputting a transmission voice and a peripheral noise, a variable gain amplifier for amplifying a reception voice signal in accordance with a gain control signal and driving the speaker in accordance with the amplified reception voice signal such that the reception voice corresponding to the amplified reception voice signal is outputted from the speaker, and an amplifier control section for generating the gain control signal based on the presence or absence of the transmission voice and a level of the peripheral noise inputted to the microphone to supply to the variable gain amplifier.

That is, the amplifier control section supplies to the variable gain amplifier the gain control signal based on a level of the peripheral noise when the transmission voice is not inputted to the microphone and the gain control signal having a fixed value while the transmission voice is inputted to the microphone. Further, the amplifier control section may further include a section for continuing to supply the gain control signal having the fixed value to the variable gain amplifier during a predetermined time period after the input of the transmission voice is ended. In this case, the amplifier control section needs to include a timer section for determining whether the predetermined time period is elapsed after the input of the transmission voice to the microphone is ended.

The gain control signal having the fixed value may be the gain control signal having a gain immediately before the transmission voice becomes present or a fixed gain. Further, the gain control signal when the transmission voice is absent may have continuously changing gain corresponding to the peripheral noise level or one of discrete gains determined based on the peripheral noise level.

The amplifier control section includes a detecting section for detecting an absence or presence of the transmission voice. In one embodiment, the detecting section includes a voice signal band pass filter for passing a voice signal band component of an audio signal inputted from the microphone, an extracting section for extracting an envelope signal of the voice signal band component, and a comparing section for comparing the envelope signal with a predetermined threshold value to detect the presence or absence of the transmission voice signal.

In order to achieve another aspect of the present invention, a method of adjusting a sound level of a reception voice in a telephone, a method of the present invention comprises the steps of:

inputting an audio signal including a transmission voice signal and a peripheral noise through a microphone;

generating a gain control signal corresponding to a level of the peripheral noise while the transmission voice signal is not present and holding the first signal immediately before input of the transmission voice signal is started while the transmission voice signal is present; and amplifying a reception voice signal by a variable gain amplifier in accordance with the gain control signal such that a voice corresponding to the reception voice signal is outputted from a speaker with a sound level determined in accordance with the gain control signal.

DESCRIPTION OF THE PREFERRED EMBODIMENTS

Figure 1:
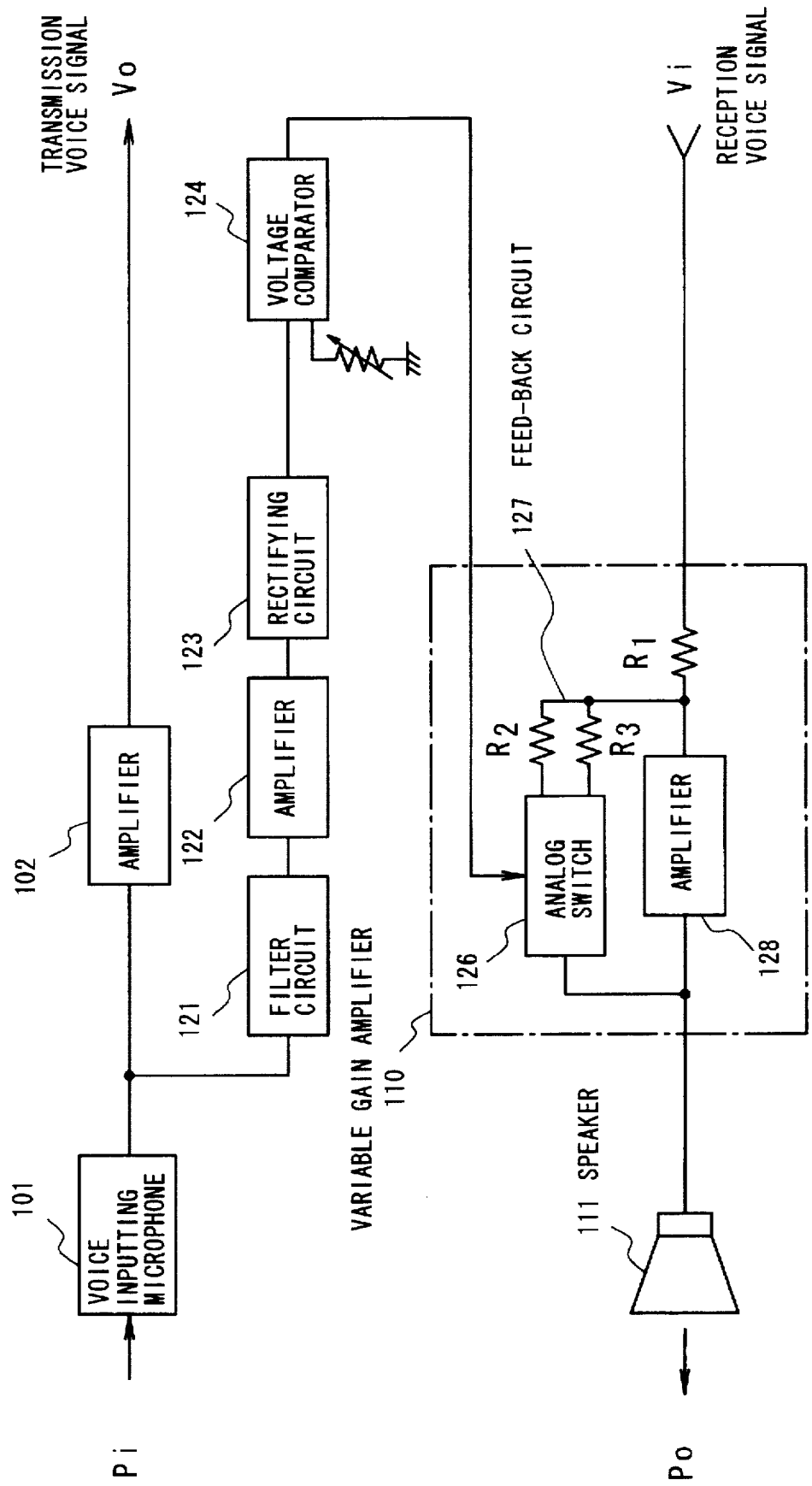
FIG. 1 is a block diagram of an example of conventional sound level variable circuit for a received voice signal.
Figure 2:
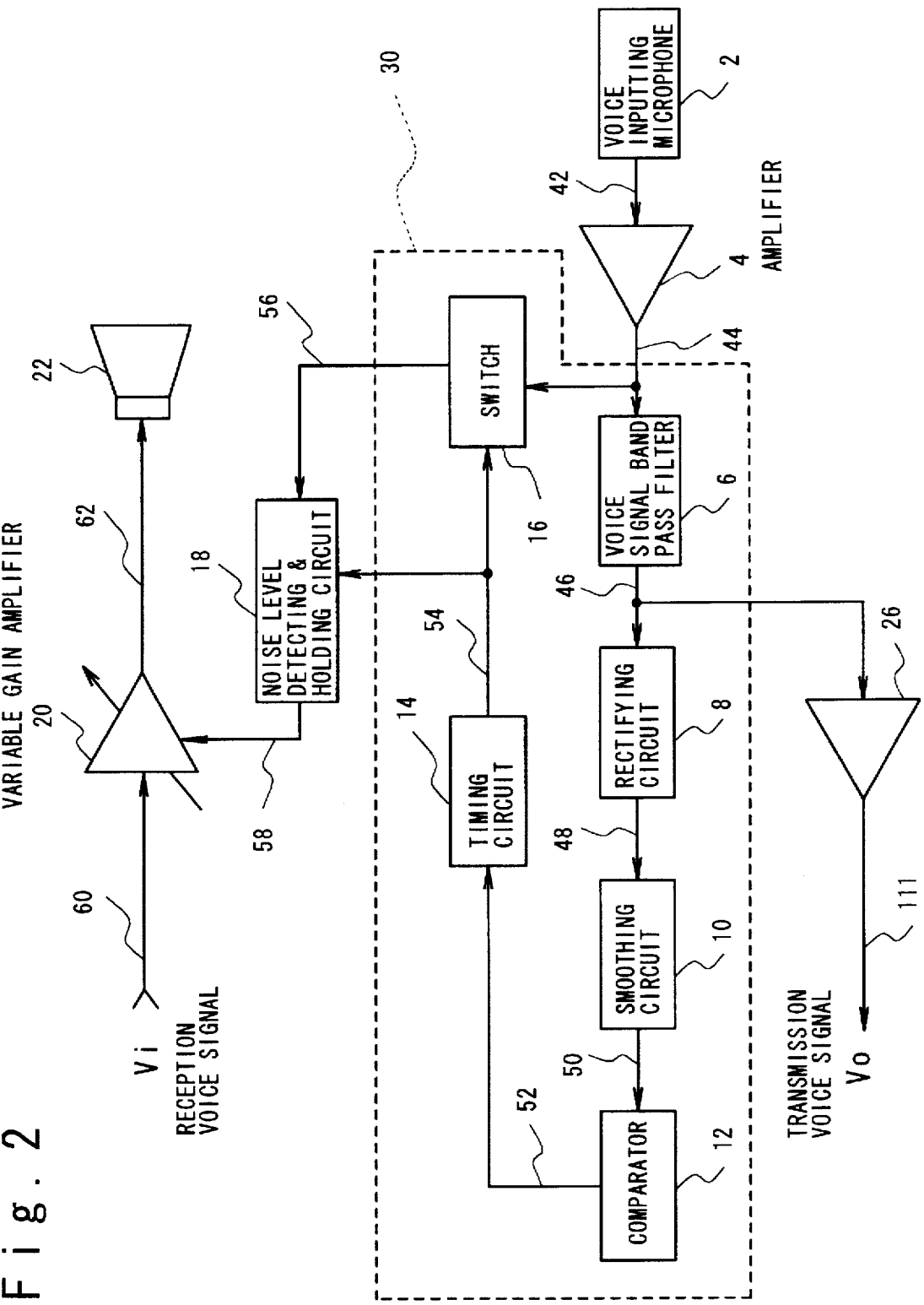
FIG. 2 is a block diagram of a sound level automatically variable circuit for a received voice signal according to an embodiment of the present invention.

Next, an embodiment of the present invention will be described with reference to the accompanying drawings. FIG. 2 is a block diagram of a sound level automatically variable circuit for a received voice signal according to the embodiment of the present invention.

In FIG. 2, the sound level automatically variable circuit includes an inputting section of an audio signal including a voice signal and peripheral noise, a transmitting section for transmitting a voice signal, a sound level adjusting section which is composed of an amplifier control section for generating a gain control signal in accordance with the presence or absence of the transmission voice signal and a period after the input of the transmission voice signal is stopped or ended, and a variable gain amplifier section for amplifying a reception voice signal in accordance with the gain control signal, and an outputting section for outputting the sound of reception voice signal amplified by the sound level adjusting section.

The inputting section is composed of a microphone 2 and an amplifier 4. The microphone 2 is of a normal telephone and inputs voice and/or peripheral noise to convert into an audio signal 42. The amplifier 4 amplifies the audio signal 42 to output as the amplified audio signal 44.

The amplified audio signal 44 is supplied to the amplifier control section which is composed of a voice signal band pass filter 6, a rectifying circuit 8, a smoothing circuit 10, a voice signal level comparator 12, a timing circuit 14, a switch 16, and a noise level detecting & holding circuit 18. The voice signal band pass filter 6 passes only the component of voice signal band of the amplified audio signal 44 to output the audio signal component of voice signal band 46 to the rectifying circuit 8 and an amplifier 26 as the transmitting section. The amplifier 26 amplifies the audio signal component 46 including a voice signal component to output to the remote telephone as the voice signal 111 from the user of the telephone. On the other hand, the rectifying circuit 8 rectifies the audio signal component 46 to output as the rectified signal 48. The smoothing circuit 10 smoothes the rectified signal 48 to produce an envelope signal 50 of the rectified signal 48. The voice signal level comparator 12 converts the inputted envelope signal 50 into a rectangular wave based on a predetermined fixed threshold value to output as a comparison signal 52. That is, the voice signal comparator 12 compares the envelope signal 50 with the threshold value and outputs the binary comparison signal 52 which has a "high" level when the envelope signal 50 is higher than the threshold value and has a "low" level when it is lower than the threshold value. In this case, the threshold value is desirably determined to be sufficiently higher than an expected level of peripheral noise. Thus, the peripheral noise of a voice signal band and a small voice signal from persons at the periphery of the telephone other than the user of the telephone can be both removed.

The timing circuit 14 generates and supplies a switch control signal 54 from the comparison signal 52 to switch 16 such that the switch 16 is set to an "off" state while the comparison signal 52 is in a "high" level and during a predetermined time period after the comparison signal 52 changes from the high level to the low level and that the switch 16 is set to an "on" state while the comparison signal is in the "low" level after the predetermined time period if the comparison signal is kept to be in the low level. As a result, if the switch control signal is in the low level, the switch 16 is turned on or closed to connect the amplified audio signal 44 to the noise level detecting & holding circuit 18. This is because it is to be taken into account that it becomes difficult to hear due to frequent changes of the sound level of a received voice signal, if the sound level is changed each time a voice signal absence period of a short time period appears between words while the user continues to speak. For this reason, if the duration of "low" of the comparison signal is shorter than the predetermined time period, it is determined that the input of a voice signal is possibly continued during the communication, so that the switch control signal for setting the switch 16 to the "off" state is outputted such that the noise detection is not performed. In this manner, the switch 16 is controlled in accordance with the switch control signal 54 outputted from the timing circuit 14. The switch control signal 54 is also supplied to the noise level detecting & holding circuit 18.

The noise level detecting & holding circuit 18 detects the level of the amplified audio signal 44, i.e., the peripheral noise level when the switch control signal 54 is in the low level so that the switch 16 closes. Accordingly, the circuit 18 outputs a gain control signal 58 proportional to the peripheral noise level to the variable gain amplifier 20 as the variable gain amplifier section. The holding circuit 18 holds the gain control signal 58 immediately when the switch control signal 54 changes from the low level to the high level such that the switch 16 is opened. In other words, the holding circuit 18 holds the gain control signal 58 in response to the change of the switch control signal 54 from the low level to the high level. Then, the circuit 18 outputs the held gain control signal 58 to the variable gain amplifier 20. The variable gain amplifier 20 amplifies a received voice signal 60 from the other user of the remote telephone in proportional to the gain control signal 58 to output as a speaker input signal 62. The speaker 22 converts the speaker input signal 62 into voice to output it.

Next, the operation of the embodiment will be described with reference to FIGS. 3A to 3E.

Figure 3A:
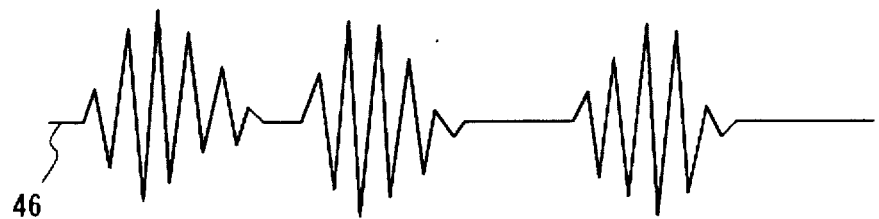
FIGS. 3A to 3E are the waveforms of output signals in various portions in the embodiment shown in FIG. 2.

If a user utters voice, the voice is converted into an audio signal 42 as well as the peripheral noise by the voice input microphone 2 and outputted from the amplifier 4 as the amplified audio signal 44. If the user does not utter voice, only peripheral noise is inputted to the microphone 2 and amplified by the amplifier 4. The amplified audio signal 44 is passed through the voice signal band pass filter 6 which passes only the component of a voice signal band of the amplified signal 44 and produces a filtered voice signal 46 as shown in FIG. 3A.

Figure 3B:
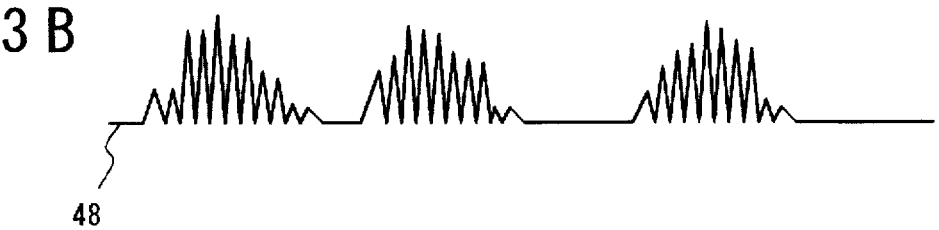
Figure 3C:
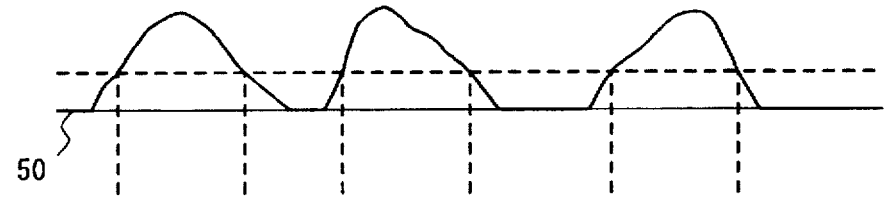

This filtered signal 46 is amplified by the amplifier 26 to be outputted to the remote telephone as the voice signal 111 of the user of the telephone, while the signal 46 is also rectified by the rectifying circuit 8 to produce a rectified signal 48 as shown in FIG. 3B. The rectified signal 48 is supplied to the smoothing circuit 10. The rectified signal 48 is smoothed by the smoothing circuit 10 such that an envelope component is extracted as shown in FIG. 3C, and outputted to the voice signal level comparator 12 as the envelope signal 50. The voice signal level comparator 12 outputs the comparison signal 52 shown in FIG. 3D and having the "high" level for the portion where the envelope signal 50 is higher than the predetermined threshold value as shown in FIG. 3C, and the "low" level for the potion where it is lower than the threshold value.

Figure 3D:
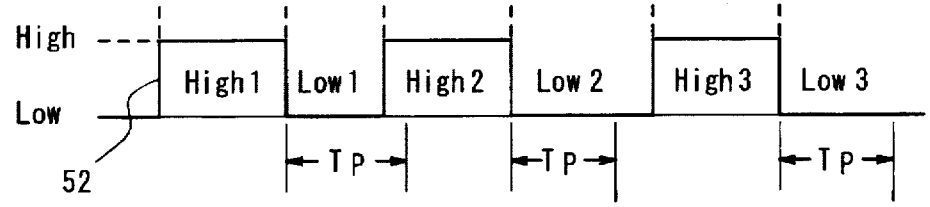
Figure 3E:
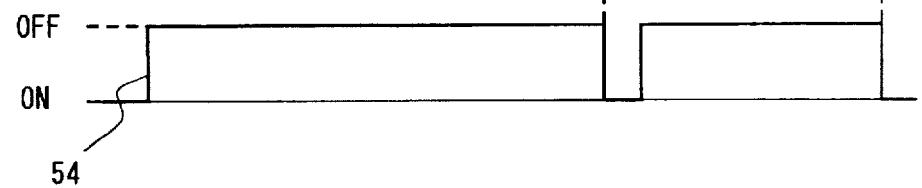

The timing circuit 14 prevents the received voice from becoming difficult to hear due to frequent changes of the sound level of a received voice signal 60. The switch control signal 54 as the output of the timing circuit 14 is set as shown in FIG. 3E when the comparison signal 52 shown in FIG. 3D is inputted. That is, the timing circuit 14 outputs the switch control signal 54 to the switch 16 such that the switch 16 is set to the "off" state when the comparison signal is in the "high" level. The timing circuit 14 also holds the switch control signal 54 in the "off" state in a case that the low state of the comparison signal 52 is shorter than a predetermined time period $T_p$, for example, one second as shown by "LOW1". On the other hand, the switch control signal 54 is changed into the "on" state after being held in the "off" state during the predetermined time period, in a case that the low state of the comparison signal 52 is longer than the predetermined time period as shown by the "Low2".

When the switch control signal 54 is in the "on" state, the voice signal is regarded to be not present so that the switch 16 is closed such that the amplifier 4 is connected to the noise level detecting circuit 18. In this case, since only the peripheral noise is inputted into the microphone 2, the amplified peripheral noise is inputted to the noise level detecting circuit 18. As a result, the peripheral noise level is detected by the circuit 18 and the gain control signal 58 having the magnitude proportional to the detected noise level is outputted to the variable gain amplifier 20. As is well known, the gain of the variable gain amplifier 20 becomes large as the magnitude of the gain control signal 58 is increased. As the result, the speaker input signal 62 also becomes greater, so that the sound level of the received voice signal is increased in the speaker 22.

When the switch control signal 54 changes from the on state to the off state, the holding circuit 18 holds the level of the gain control signal 58. While the switch control signal 54 is in the "off" state, the switch 16 is opened so that the noise level detecting circuit 18 continues to output the gain control signal 58, which is the same as outputted immediately before the switch 16 is changed into the "off" state. The gain of the variable gain amplifier 20 is fixed and the sound level of the received voice signal from the speaker 22 is kept to be the sound level immediately before the speaking user utters any voice.

The present invention is described above taking the preferred embodiments as examples. However, the present invention is not limited to the above embodiments and various variations and modifications would be possible to a person skilled in the art based on the description of the scope of the patent to be claimed.

For instance, in the embodiment, the timing circuit 14 is provided to prevent sound level adjustment from being frequently executed during the communication, specifically while the user speaks. However, this circuit is not always necessary in order to construct the present invention. The binary signal from the sound level comparator may be directly connected to the switch 16.

Further, in the embodiments, the gain control signal from the noise level detecting circuit 18 is proportional to the peripheral noise level. However, the gain control signal may have one of two or more discrete amplifications in correspondence to the peripheral noise level.

In addition, in the embodiment, the threshold level of the comparator 12 is fixed. However, the threshold level may be determined such that it is proportional to the peripheral noise level. In this case, it is effective when the noise level of the voice signal band is remarkably high.

Furthermore, in the present invention, the predetermined time period may be freely changed. If the predetermined time period is set to be long, the gain control could be inhibited during the duration when the user utters words for communication.

As described above, in the received voice signal sound level automatically variable circuit according to the present invention, any dedicated microphone for inputting the peripheral noise is not provided and the sound level adjustment of the received voice signal is made possible using the voice inputting microphone. Since the voice signal nonpresence detecting circuit is possible to incorporate it into an IC for processing a voice signal which is normally used in a portable telephone, the telephone can be made small compared to the case of using the dedicated microphone.

Also, since the peripheral noise level is detected when the user does not utter any voice, the pure noise level in which the voice signal from the user is not mixed can be detected, and therefore the sound level of the received voice signal can be adjusted in accordance with the pure noise level in which the voice signal from the speaking user is not mixed can be detected.

In the embodiment, the gain control signal is held. However, the noise level is held and the gain control signal may be generated based on the held noise level.

What is claimed is:

1. An apparatus for adjusting a sound level of a reception voice in a telephone, comprising:

a speaker for outputting a reception voice;

a microphone for inputting a transmission voice and a peripheral noise;

a variable gain amplifier for amplifying a reception voice signal in accordance with a gain control signal and driving said speaker in accordance with the amplified reception voice signal such that the reception voice corresponding to said amplified reception voice signal is outputted from said speaker; and amplifier control means for supplying to said variable gain amplifier as said gain control signal a first signal such that said variable gain amplifier amplifies said reception voice signal in response to said peripheral noise inputted to said microphone when said transmission voice is not inputted for a predetermined time period to said microphone and a second signal such that said variable gain amplifier amplifies said reception voice signal in response to said peripheral noise immediately before the start of said transmission voice while said transmission voice is inputted to said microphone.

2. An apparatus according to claim 1, wherein said amplifier control means includes:

detecting means for detecting an absence or presence of said transmission voice;

gain control signal supplying means for supplying to said variable gain amplifier said first signal as gain control signal determined based on a level of said peripheral noise inputted from said microphone in response to the detection of the absence of said transmission voice by said detecting means for greater than said predetermined time period, and for holding said gain control signal when the input of said transmission voice is started and for supplying the held signal as said second signal to said variable gain amplifier while said transmission voice is inputted.

3. An apparatus according to claim 2, wherein said detecting means includes:

a voice signal band pass filter for passing a voice signal band component of an audio signal inputted from said microphone;

extracting means for extracting an envelope signal of said voice signal band component; and comparing means for comparing said envelope signal with a predetermined threshold value to detect the presence or absence of the transmission voice.

4. An apparatus according to claim 1, wherein said amplifier control means further includes means for continuing to supply said second signal to said variable gain amplifier during said predetermined time period after the input of said transmission voice is ended.

5. An apparatus according to claim 4, wherein said amplifier control means includes:

detecting means for detecting a presence of said transmission voice signal;

timer means for determining whether said predetermined time period is elapsed after the input of said transmission voice to said microphone is ended; and gain control signal supplying means for supplying to said variable gain amplifier said first signal as gain control signal determined based on a level of said peripheral noise inputted from said microphone in response to the detection of the absence of said transmission voice by said detecting means after said predetermined time period from the end of input of said transmission voice to said microphone, and for holding said gain control signal when the input of said transmission voice is started and for supplying the held signal as said second signal to said variable gain amplifier while said transmission voice is inputted and during said predetermined time period after the end of input of said transmission voice to said microphone.

6. An apparatus according to claim 5, wherein said detecting means includes:

a voice signal band pass filter for passing a voice signal band component of an audio signal inputted from said microphone;

extracting means for extracting an envelope signal of said voice signal band component; and comparing means for comparing said envelope signal with a predetermined threshold value to detect the presence or absence of the transmission voice signal.

7. A method of adjusting a sound level of a reception voice in a telephone, comprising the steps of:

inputting an audio signal including a transmission voice signal and a peripheral noise through a microphone;

generating a gain control signal corresponding to a level of said peripheral noise while said transmission voice signal is not present for a predetermined time period and holding said gain control signal immediately before input of said transmission voice signal is started while said transmission voice signal is present; and amplifying a reception voice signal by a variable gain amplifier in accordance with said gain control signal such that a voice corresponding to said reception voice signal is outputted from a speaker with a sound level determined in accordance with said gain control signal.

8. A method according to claim 7, wherein said generating step includes:

detecting a presence of said transmission voice signal; and holding said gain control signal in response to the detection of the presence of said transmission voice signal to output said gain control signal held while the presence of said transmission voice signal is detected and outputting said gain control signal in response to said peripheral noise.

9. A method according to claim 8, wherein said detecting step includes:

filtering a voice signal band component from the audio signal;

extracting an envelope signal of said voice signal band component; and comparing means for comparing said envelope signal with a predetermined threshold value to detect the presence or absence of the transmission voice signal.

10. A method according to claim 7, wherein said outputting step includes:

detecting a presence of said transmission voice signal;

determining whether said predetermined time period is elapsed;

outputting said held gain control signal while said transmission voice signal is present;

outputting said held gain control signal during said predetermined time period after the input of said transmission voice signal is ended; and outputting said gain control signal in response to said peripheral noise after said predetermined time period.

11. A method according to claim 10, wherein said detecting step includes:

filtering a voice signal band component from the audio signal;

extracting an envelope signal of said voice signal band component; and comparing said envelope signal with a predetermined threshold value to detect the presence/absence of the transmission voice signal.

12. An apparatus for adjusting a sound level of a reception voice in a telephone, comprising:

a speaker for outputting a reception voice;

a microphone for inputting a transmission voice and a peripheral noise;

a variable gain amplifier for amplifying a reception voice signal in accordance with a gain control signal and driving said speaker in accordance with the amplified reception voice signal such that the reception voice corresponding to said amplified reception voice signal is outputted from said speaker; and amplifier control means for generating said gain control signal based on the presence or absence of the transmission voice for a predetermined time period and a level of said peripheral noise inputted to said microphone to supply to said variable gain amplifier.

13. An apparatus according to claim 12, wherein said amplifier control means includes:

detecting means for detecting an absence or presence of said transmission voice;

gain control signal supplying means for supplying said gain control signal to said variable gain amplifier such that said variable gain amplifier amplifies said reception voice signal with one of discrete amplification levels determined in accordance with said peripheral noise level when said transmission voice is absent for said predetermined time period and such that said variable gain amplifier amplifies said reception voice signal with a fixed amplification level determined in response to said peripheral noise level immediately before the start of said transmission voice while said transmission voice is present.

14. An apparatus according to claim 13, wherein said detecting means includes:

a voice signal band pass filter for passing a voice signal band component of an audio signal inputted from said microphone;

extracting means for extracting an envelope signal of said voice signal band component; and comparing means for comparing said envelope signal with a predetermined threshold value to detect the presence or absence of the transmission voice.

15. An apparatus according to claim 12, wherein said amplifier control means further includes means for continuing to supply a fixed gain control signal to said variable gain amplifier during said predetermined time period after the input of said transmission voice is ended.

16. An apparatus according to claim 15, wherein said gain control signal supplying means includes:

detecting means for detecting a presence of said transmission voice signal;

timer means for determining whether said predetermined time period is elapsed after the input of said transmission voice to said microphone is ended; and gain control signal supplying means for supplying said gain control signal to said variable gain amplifier such that said variable gain amplifier amplifies said reception voice signal with one of discrete amplification levels determined in accordance with said peripheral noise level when said transmission voice is absent and such that said variable gain amplifier amplifies said reception voice signal with a fixed amplification level determined in response to said peripheral noise level immediately before the start of said transmission voice while said transmission voice is present and during said predetermined time period after said transmission voice becomes absent.

17. An apparatus according to claim 15, wherein said fixed gain control signal is the gain control signal immediately before said transmission voice signal becomes present.

18. An apparatus according to claim 15, wherein said detecting means includes:

a voice signal band pass filter for passing a voice signal band component of an audio signal inputted from said microphone;

extracting means for extracting an envelope signal of said voice signal band component; and comparing means for comparing said envelope signal with a predetermined threshold value to detect the presence or absence of the transmission voice signal.

* * * * *